US006831246B2

(12) United States Patent
Krenz

(10) Patent No.: US 6,831,246 B2
(45) Date of Patent: Dec. 14, 2004

(54) MULTI-STATION ELECTRICAL DISCHARGE MACHINING WITH SINGLE VELOCITY COMMAND

(75) Inventor: Rudi Oskar Krenz, Albuquerque, NM (US)

(73) Assignee: General Electric Company, Schenectady, NY (US)

( * ) Notice: Subject to any disclaimer, the term of this patent is extended or adjusted under 35 U.S.C. 154(b) by 170 days.

(21) Appl. No.: 10/242,639

(22) Filed: Sep. 12, 2002

(65) Prior Publication Data

US 2004/0050821 A1 Mar. 18, 2004

(51) Int. Cl.[7] .............................. B23H 1/00; B23H 7/18; B23H 7/20
(52) U.S. Cl. ................... 219/69.16; 219/69.2; 318/571; 700/162
(58) Field of Search .............................. 219/69.16, 69.2, 219/69.15; 318/573, 667, 571; 700/162

(56) References Cited

U.S. PATENT DOCUMENTS

| | | | | |
|---|---|---|---|---|
| 4,197,443 A | * | 4/1980 | Sidenstick | 219/69.15 |
| 4,296,302 A | * | 10/1981 | Bell et al. | 219/69.16 |
| 4,484,053 A | * | 11/1984 | Michishita et al. | 219/69.15 |
| 4,510,365 A | * | 4/1985 | MacGregor et al. | 219/69.16 |
| 5,075,530 A | * | 12/1991 | Lee | 219/69.11 |
| 5,089,681 A | * | 2/1992 | El-Menshawy | 219/69.16 |
| 5,194,793 A | * | 3/1993 | Niimi | 318/568.15 |
| 5,266,878 A | * | 11/1993 | Makino et al. | 318/571 |
| 6,326,576 B1 | * | 12/2001 | Krenz et al. | 219/69.11 |
| 6,369,343 B1 | | 4/2002 | Krenz et al. | |
| 6,627,838 B2 | * | 9/2003 | Kato et al. | 219/69.2 |

FOREIGN PATENT DOCUMENTS

| | | | | |
|---|---|---|---|---|
| JP | 61-178123 A | * | 8/1986 | |
| JP | 62-15015 A | * | 1/1987 | |
| JP | 6-8052 A | * | 1/1994 | |
| JP | 6-155168 A | * | 6/1994 | |

OTHER PUBLICATIONS

U.S. Appl. No. 09/401,524, filed Sep. 22, 1999.
U.S. Appl. No. 09/855,443, filed May 15, 2001.

* cited by examiner

Primary Examiner—Geoffrey S. Evans
(74) Attorney, Agent, or Firm—Adams Evans P.A.; V. G. Ramaswamy

(57) ABSTRACT

An electrical discharge machining (EDM) apparatus includes a plurality of machining heads, at least one EDM control system, and a plurality of programmable servo drives. Each one of the programmable servo drives is connected to the EDM control system and to a respective one of the plurality of machining heads. The programmable servo drives receive a velocity command from the EDM control system and feed a control signal to a respective one of the plurality of machining heads to control electrode positioning.

9 Claims, 2 Drawing Sheets

MULTI-STATION ELECTRICAL DISCHARGE MACHINING WITH SINGLE VELOCITY COMMAND

BACKGROUND OF THE INVENTION

This invention relates generally to electrical discharge machining and more particularly to electrical discharge machining workpieces, such as aircraft engine parts, which have several features machined therein.

Electrical discharge machining (EDM) is a well known process for forming features, such as holes, slots and notches of various shapes and configurations, in an electrically conductive workpiece. Conventional EDM apparatuses typically employ an electrode having the desired shape that is advanced toward the workpiece. A suitable power supply is applied to create an electrical potential between the workpiece and electrode for forming a controlled spark which melts and vaporizes the workpiece material to form the desired feature. The cutting pattern of the electrode is usually computer numerically controlled whereby servomotors control the relative positions of the electrode and workpiece. During machining, the electrode and workpiece are immersed in a dielectric fluid, which provides insulation against premature spark discharge, cools the machined area, and flushes away the removed material.

One drawback to electrical discharge machining is that it is a relatively slow process, especially when several distinct features need to be machined into a workpiece. This is particularly so in the aircraft engine industry where electrical discharge machining is widely used for machining various features into aircraft engine parts. To increase the manufacturing output of such parts, it is common to use an EDM apparatus that machines a number of parts at one time. Such an apparatus has a plurality of work stations, each of which has a workpiece fixture located in a single dielectric tank. The work stations are all typically connected to a common power supply. Thus, machining takes place in series one part at a time. That is, a spark will be created in the first work station and then the next work station and so on until each station has a spark supplied. This sequence is repeated until the machining operation is completed for each workpiece. Although throughput can be improved with this type of apparatus, machining multiple features into a single workpiece is still a relatively slow process.

To further speed production, it has been proposed to use an EDM apparatus that employs multiple electrodes in each work station. Such an EDM apparatus is capable of performing multiple machining operations on a workpiece simultaneously. However, each electrode is provided with its own power supply and computer numerical control (CNC). The large number of power supplies and CNCs increases the complexity and cost of the manufacturing system and requires a lot of floor space in the machining shop. The total number of power supplies and CNCs can be reduced by using a power transfer switch that selectively delivers power to one work station at a time. While reducing the number of power supplies and CNCs, this configuration can only operate in an alternating mode.

Accordingly, there is a need for an EDM apparatus that provides multiple machining operations simultaneously with less EDM equipment than is presently used.

SUMMARY OF THE INVENTION

The above-mentioned need is met by the present invention which provides an electrical discharge machining apparatus including a plurality of machining heads, at least one EDM control system, and a plurality of programmable servo drives. Each one of the programmable servo drives is connected to the EDM control system and to a respective one of the plurality of machining heads. The programmable servo drives receive a velocity command from the EDM control system and feed a control signal to a respective one of the plurality of machining heads to control electrode positioning.

The present invention and its advantages over the prior art will become apparent upon reading the following detailed description and the appended claims with reference to the accompanying drawings.

DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
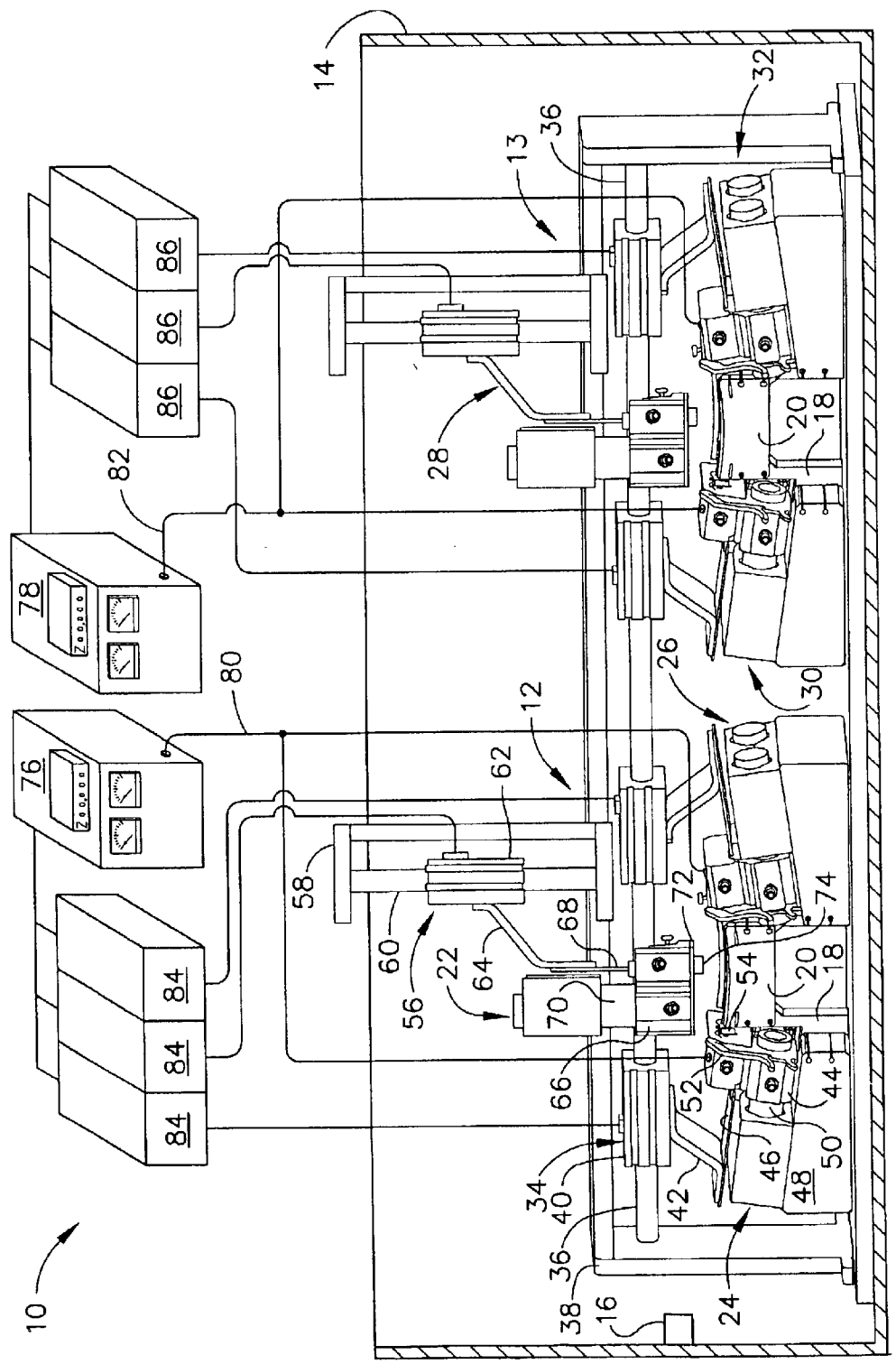
FIG. 1 is a schematic view of a first embodiment of an EDM apparatus.

Referring to the drawings wherein identical reference numerals denote the same elements throughout the various views, FIG. 1 shows an electrical discharge machining (EDM) apparatus 10. The EDM apparatus 10 includes a plurality of individual work stations 12 and 13 disposed in a tank 14, which is shown in cut-away to reveal the work stations 12, 13 therein. Although two work stations are shown in FIG. 1 for purposes of illustration, it should be noted that virtually any number of such stations could be employed in the EDM apparatus 10 of the present invention. Each work station 12, 13 operates independently to machine a separate workpiece. As is well known in the field, the tank 14 is filled with a suitable dielectric fluid, such as a dielectric oil, so that the workpiece is immersed in the fluid. The dielectric fluid insulates against premature spark discharge, cools the machined area, and flushes away machining debris. A float switch 16 is provided in the tank 14 for detecting when the dielectric fluid reaches a sufficient depth. The float switch 16 is located such that the level of dielectric fluid is just high enough to immerse workpieces installed in the work stations 12, 13. A conventional filtering system (not shown) is connected to the tank 14 for filtering the dielectric fluid, preferably down to one micron absolute.

Each work station 12, 13 includes a workpiece fixture 18 supported in the tank 14 for holding a workpiece 20. The example workpieces 20 shown in FIG. 1 are shrouds for use in an aircraft engine. A typical aircraft engine employs a plurality of such shrouds arranged in an annular array around the engine's turbine rotor. The shrouds thus define an outer boundary for hot combustion gases flowing through the turbine. Shrouds are ordinarily made by a process in which a casting of the shroud is made, and various features are then machined into the casting. For example, the shrouds 20 of FIG. 1 have an anti-rotation notch machined into one side thereof and a seal slot machined into each end thereof. It should be noted that a shroud is only an illustrative example of one workpiece that is suitable for use with the EDM apparatus 10. The present invention is not limited to such workpieces and is applicable to virtually any workpiece in which multiple features are machined. Furthermore, it should be recognized that although the workpieces are shown to be the same for each work station, the work stations do not necessarily have to machine identical workpieces.

The first work station 12 includes first, second and third machining heads 22, 24 and 26, wherein each machining head machines a different feature into the corresponding workpiece 20. In this case, the first machining head 22 is mounted above the workpiece 20 for machining the anti-rotation slot. The second machining head 24 is mounted adjacent one end of the workpiece 20 for machining the first seal slot, and the third machining head 26 is mounted adjacent the other end of the workpiece 20 for machining the second seal slot. The second work station 13 includes fourth, fifth and sixth machining heads 28, 30 and 32, wherein each machining head machines a different feature into the corresponding workpiece 20. The fourth machining head 28 is mounted above the workpiece 20 for machining the anti-rotation slot. The fifth machining head 30 is mounted adjacent one end of the workpiece 20 for machining the first seal slot, and the sixth machining head 32 is mounted adjacent the other end of the workpiece 20 for machining the second seal slot. Thus, each work station 12, 13 is able to simultaneously machine all of the features for a single workpiece. Although each work station is shown to have three machining heads, it should be noted that this is for purposes of illustration only and work stations having a different number of machining heads could also be employed.

The second machining head 24 includes a linear servomotor 34 disposed adjacent to a first end of the workpiece fixture 18 of the first work station 12. It should be noted that while linear servomotors are shown in FIG. 1 to facilitate disclosure of the present invention, rotary servomotors could alternatively be used. However, linear motors are generally preferred because of their better speed, faster frequency response and positional accuracy. The servomotor 34 includes a linear motor stator rod 36 mounted over the workpiece 20 by a frame 38. A linear motor slider 40 is slidingly mounted on the stator rod 36. A bracket 42 is attached to the underside of the slider 40, and a slide block 44 is connected to the bracket 42 via a flexible connector 46. The slide block 44 is slidingly supported above the base of the tank 14 by a stationary block 48 and one or more support rods 50. An electrode holder 52 is mounted on the slide block 44 and supports an electrode 54.

When the servomotor 34 is energized, the slider 40 is caused to move linearly with respect to the stator rod 36. The movement of the slider 40 causes the slide block 44 to slide along the support rods 50, so that the electrode 54 moves into or out of machining engagement with the first end of the workpiece 20. In the case of a curved workpiece, such as the shroud 20, the support rods 50 are arranged at an angle with respect to the base of the tank 14 to accommodate the workpiece curvature. The slider 40 moves horizontally, whereas the slide block 44 moves at an incline. The divergence between the two lines of motion is accommodated by the flexible connector 46. The flexible connector 46 can also provide electrical isolation between the servo power of the servomotor 34 and the EDM power supplies. The third machining head 26 is essentially the same as the second machining head 24, except that it is disposed adjacent the opposite end of the workpiece 20. The sliders of both the second and third machining heads share the same stator rod 36.

The first machining head 22 has a linear servomotor 56 mounted on a column 58. The column 58 is attached to the frame 38 in a position adjacent to the workpiece fixture 18 of the first work station 12. The servomotor 56 comprises a linear motor stator 60, which is fixedly attached to the column 58, and a linear motor slider 62, which is slidingly mounted on the stator 60. A bracket 64 is attached to one side of the slider 62, and a slide block 66 is connected to the bracket 64 via a flexible connector 68. The slide block 66 is slidingly supported above the workpiece fixture 18 by the frame 38 and one or more support rods 70. An electrode holder 72 is mounted on the slide block 66 and supports an electrode 74 over the workpiece 20. When the linear servomotor 56 is energized, the slider 62 is caused to move linearly with respect to the stator 60. In this case, the servomotor 56 is arranged vertically on the column 58 so that the slider 62 will move vertically, thereby moving the electrode 74 into or out of machining engagement with the workpiece 20.

The fourth, fifth and sixth machining heads 28, 30 and 32 of the second work station 13 are substantially similar to the first, second and third machining heads 22, 24 and 26, respectively, of the first work station 12. Consequently, a detailed description of the fourth, fifth and sixth machining heads 28, 30 and 32 will not be repeated here. It is noted that, as shown in FIG. 1, the sliders of the fifth and sixth machining heads 30, 32 share the stator rod 36 with the sliders of the second and third machining heads 24, 26. The stator rod 36 thus spans both work stations 12, 13. Alternatively, a separate stator rod could be provided for each work station.

The EDM apparatus 10 also includes two standard EDM control systems 76 and 78. As is known in the field, each EDM control system 76, 78 includes a power supply or spark generator and a controller, such as a computer numerical control (CNC). The power supply of the first EDM control system 76 provides energy to the first, second and third machining heads 22, 24 and 26 of the first work station 12 via power cables 80. The power supply of the second EDM control system 78 provides energy to the fourth, fifth and sixth machining heads 28, 30 and 32 of the second work station 13 via power cables 82.

The controller of the first EDM control system 76 is connected to a first group of three programmable servo drives 84, and the controller of the second EDM control system 78 is connected to a second group of three programmable servo drives 86. Each one of the three first programmable servo drives 84 is connected to a corresponding one of the first, second and third machining heads 22, 24 and 26 to individually control electrode positioning in the first, second and third machining heads 22, 24 and 26, respectively. Similarly, each one of the three second programmable servo drives 86 is connected to a corresponding one of the fourth, fifth and sixth machining heads 28, 30 and 32 to individually control electrode positioning in the fourth, fifth and sixth machining heads 28, 30 and 32, respectively.

The programmable servo drives 84, 86, which are also referred to as smart servo drives, are programmed to have individual (separate from the EDM control systems 76, 78) distance control. Each servo drive 84, 86 can be programmed with a different "start" and "stop" point so as to individually control the depth of cut made by the corresponding machining head. Suitable programmable servo drives are commercially available from Industrial Devices Corporation.

The programmable servo drives 84, 86 are driven by a single velocity command from the respective EDM control system 76, 78. That is, the first EDM control system 76 generates a single velocity command that is fed to each of the first servo drives 84, and the second EDM control system 78 generates a single velocity command that is fed to each of the second servo drives 86. Based on their programming and the inputted velocity signal, the servo drives 84, 86 send control signals to the servomotor of the corresponding machining head to dictate displacement of the electrodes. The servo drives 84, 86 also cause the electrode of the corresponding machining head to be retracted to its zero position when the "stop" point is reached. This is based on input from linear measuring scales (not shown) positioned adjacent to each servomotor. The linear measuring scales are conventional devices that precisely measure the position and velocity of the servomotor sliders and provide feedback of these measurements to the servo drives 84, 86. While the depth of cut is controlled by the programmable servo drives 84, 86, the EDM control systems 76, 78 control all spark erosion parameters and auxiliary functions of the EDM process.

In operation, the EDM apparatus 10 can operate in an alternating, simultaneous or continuous mode. In the alternating mode, the first work station 12 alternates with the second work station 13; while one work station is operating, the other work station is inactive and available for workpiece loading. In the simultaneous mode, both work stations operate simultaneously. When both work stations complete a machining operation, new workpieces are loaded in each work station and both work stations are activated together. In the continuous mode, each work station is immediately loaded with a new workpiece and restarted upon completion of a machining operation, regardless of the status of the other work station.

Figure 2:
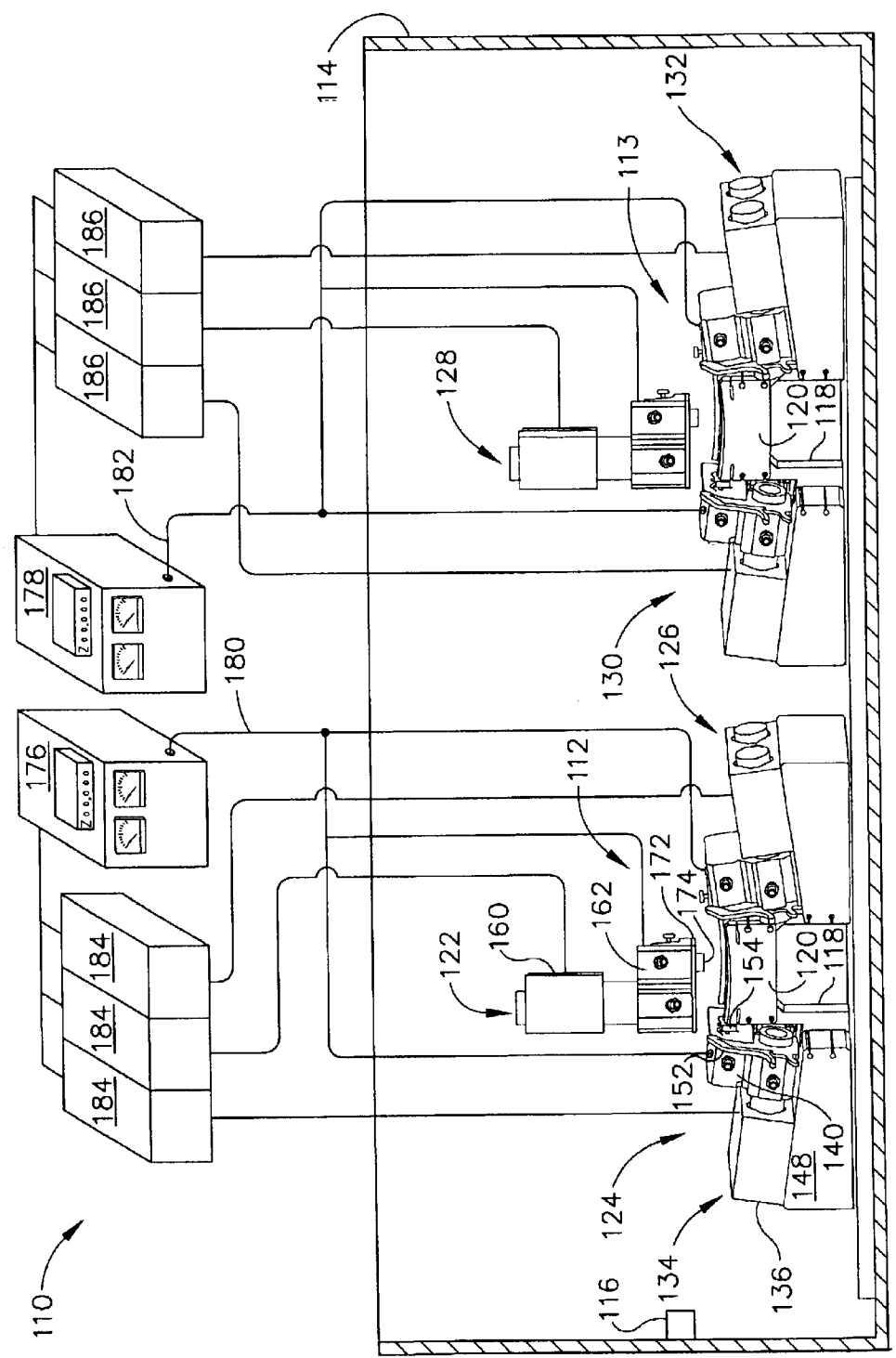
FIG. 2 is a schematic view of a second embodiment of an EDM apparatus.

Turning to FIG. 2, a second electrical discharge machining (EDM) apparatus 110 is shown. The EDM apparatus 110 is similar to the first embodiment of FIG. 1 in that it includes a plurality of individual work stations 112 and 113 disposed in a tank 114, wherein each work station 112, 113 operates independently to machine a separate workpiece. As before, the EDM apparatus 110 is not limited to two work stations. The tank 114 is filled with a suitable dielectric fluid, such as a dielectric oil, so that the workpiece is immersed in the fluid. A float switch 116 is provided in the tank 114 for detecting when the dielectric fluid reaches a sufficient depth. The float switch 116 is located such that the level of dielectric fluid is just high enough to immerse workpieces installed in the work stations 112, 113. A conventional filtering system (not shown) is connected to the tank 114 for filtering the dielectric fluid, preferably down to one micron absolute.

Each work station 112, 113 includes a workpiece fixture 118 supported in the tank 114 for holding a workpiece 120. As before, and by way of example only, the example workpieces 120 shown in FIG. 2 are shrouds for use in an aircraft engine.

The first work station 112 includes first, second and third machining heads 122, 124 and 126, wherein each machining head machines a different feature into the corresponding workpiece 120. In this case, the first machining head 122 is mounted above the workpiece 120 for machining the anti-rotation slot. The second machining head 124 is mounted adjacent one end of the workpiece 120 for machining the first seal slot, and the third machining head 126 is mounted adjacent the other end of the workpiece 120 for machining the second seal slot. The second work station 113 includes fourth, fifth and sixth machining heads 128, 130 and 132, wherein each machining head machines a different feature into the corresponding workpiece 120. The fourth machining head 128 is mounted above the workpiece 120 for machining the anti-rotation slot. The fifth machining head 130 is mounted adjacent one end of the workpiece 120 for machining the first seal slot, and the sixth machining head 132 is mounted adjacent the other end of the workpiece 120 for machining the second seal slot. Thus, each work station 112, 113 is able to simultaneously machine all of the features for a single workpiece.

The EDM apparatus 110 differs from the first embodiment in the configuration of the machining heads. Specifically, the second machining head 124 includes a linear servomotor 134 disposed adjacent to a first end of the workpiece fixture 118 of the first work station 112. The servomotor 134 includes a linear motor stator 136 mounted adjacent to the workpiece fixture 118 by a stationary block 148. A linear motor slider 140 is slidingly mounted on the stator 136. An electrode holder 152 is mounted on the slider 140 and supports an electrode 154. When the linear servomotor 134 is energized, the slider 140 is caused to move linearly with respect to the stator 136, thereby moving the electrode 154 into or out of machining engagement with the workpiece 120. The third machining head 126 is essentially the same as the second machining head 124, except that it is disposed adjacent the opposite end of the workpiece 120.

The first machining head 122 has a linear servomotor 156 mounted on a column (not shown) so as to be located above the workpiece fixture 118 of the first work station 112. The servomotor 156 comprises a linear motor stator 160, which is fixedly attached to the column, and a linear motor slider 162, which is slidingly mounted on the stator 160. An electrode holder 172 is mounted on the slider 162 and supports an electrode 174 over the workpiece 120. When the linear servomotor 156 is energized, the slider 162 is caused to move linearly with respect to the stator 160, thereby moving the electrode 174 into or out of machining engagement with the workpiece 120.

The fourth, fifth and sixth machining heads 128, 130 and 132 of the second work station 113 are substantially similar to the first, second and third machining heads 122, 124 and 126, respectively, of the first work station 112. Consequently, a detailed description of the fourth, fifth and sixth machining heads 128, 130 and 132 will not be repeated here.

The EDM apparatus 110 also includes two standard EDM control systems 176 and 178. As in the first embodiment, each EDM control system 176, 178 includes a power supply or spark generator and a controller, such as a computer numerical control (CNC). The power supply of the first EDM control system 176 provides energy to the first, second and third machining heads 122, 124 and 126 of the first work station 112 via power cables 180. The power supply of the second EDM control system 178 provides energy to the fourth, fifth and sixth machining heads 128, 130 and 132 of the second work station 113 via power cables 182.

The controller of the first EDM control system 176 is connected to a first group of three programmable servo drives 184, and the controller of the second EDM control system 178 is connected to a second group of three programmable servo drives 186. Each one of the three first programmable servo drives 184 is connected to a corresponding one of the first, second and third machining heads 122, 124 and 126 to individually control electrode positioning in the first, second and third machining heads 122, 124 and 126. Similarly, each one of the three second programmable servo drives 186 is connected to a corresponding one of the fourth, fifth and sixth machining heads 128, 130 and 132 to individually control electrode positioning in the fourth, fifth and sixth machining heads 128, 130 and 132.

The programmable servo drives 184, 186 operate essentially the same as those of the first embodiment. That is, each of the servo drives 184, 186 is programmed to have individual (separate from the EDM control systems 76, 78) distance control so as to individually control the depth of cut made by the corresponding machining head. The programmable servo drives 184, 186 are driven by a single velocity command from the respective EDM control system 176, 178. That is, the first EDM control system 176 generates a single velocity command that is fed to each of the first servo drives 184, and the second EDM control system 178 generates a single velocity command that is fed to each of the second servo drives 186. Based on their programming and the inputted velocity signal, the servo drives 184, 186 send signals to the servomotor of the corresponding machining head to dictate displacement of the electrodes. The servo drives 184, 186 also cause the electrode of the corresponding machining head to be retracted to its zero position when the "stop" point is reached.

The foregoing has described an EDM apparatus that more efficiently machines workpieces, particularly aircraft engine parts, having multiple features. While specific embodiments of the present invention have been described, it will be apparent to those skilled in the art that various modifications thereto can be made without departing from the spirit and scope of the invention as defined in the appended claims.

What is claimed is:

1. An electrical discharge machining apparatus comprising:
    a plurality of machining heads each including a servo;
    an EDM control system operable to generate a single velocity command; and
    a plurality of programmable servo drives, wherein:
        each one of said programmable servo drives is connected to said EDM control system and to a respective one of said plurality of machining heads; and
        each one of said programmable servo drives is operable to receive said velocity command from said EDM control system and to feed a control signal to a respective one of said plurality of machining heads in response to both said velocity signal and to an individual program of said servo drive.

2. The electrical discharge machining apparatus of claim 1 wherein each one of said machining heads includes an electrode.

3. The electrical discharge machining apparatus of claim 1 further comprising: a second plurality of machining heads; a second EDM control system; and a second plurality of programmable servo drives, each one of said second programmable servo drives being connected to said second EDM control system and to a respective one of said second plurality of machining heads.

4. The electrical discharge machining apparatus of claim 1 wherein each machining head comprises a linear servomotor having a stator, a slider slidingly mounted on said stator and an electrode holder attached to said slider.

5. An electrical discharge machining apparatus comprising:
    a plurality of machining heads;
    an EDM control system; and
    a plurality of programmable servo drives, each one of said programmable servo drives connected to receive a velocity command from said EDM control system and to feed a control signal to a respective one of said plurality of machining heads, in response to said velocity command and to an individual program of said servo drive.

6. The electrical discharge machining apparatus of claim 5 wherein each one of said machining heads includes an electrode and each of said control signals dictates electrode displacement.

7. The electrical discharge machining apparatus of claim 5 wherein said EDM control system generates a single velocity command that is fed to each of said programmable servo drives.

8. The electrical discharge machining apparatus of claim 5 further comprising: a second plurality of machining heads; a second EDM control system; and a second plurality of programmable servo drives, each one of said second programmable servo drives connected to receive a velocity command from said second EDM control system and to feed a control signal to a respective one of said second plurality of machining heads.

9. The electrical discharge machining apparatus of claim 5 wherein each machining head comprises a linear servomotor having a stator, a slider slidingly mounted on said stator and an electrode holder attached to said slider.

* * * * *